(12) United States Patent
Akifusa

(10) Patent No.: US 7,755,979 B2
(45) Date of Patent: Jul. 13, 2010

(54) AUDIO PLAYBACK DEVICE

(75) Inventor: Hirokazu Akifusa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1178 days.

(21) Appl. No.: 11/360,029

(22) Filed: Feb. 22, 2006

(65) Prior Publication Data

US 2006/0198610 A1    Sep. 7, 2006

(30) Foreign Application Priority Data

Feb. 25, 2005    (JP)    ............... 2005-050554

(51) Int. Cl.
*G11B 7/085*    (2006.01)
*H04N 7/00*    (2006.01)
(52) U.S. Cl. ............... 369/30.03; 386/95; 386/124
(58) Field of Classification Search ............ 369/30.06, 369/30.05, 32.01, 30.07, 47.1, 47.15, 30.03, 369/30.08; 386/68, 124, 96, 126, 95; 711/112, 711/154
See application file for complete search history.

(56) References Cited

U.S. PATENT DOCUMENTS 6,745,164 B2    6/2004    Akita

2004/0017996 A1    1/2004    Yamaguchi
2006/0204940 A1    9/2006    Okuzawa
2006/0263065 A1*    11/2006    Akifusa ............... 386/96

FOREIGN PATENT DOCUMENTS

JP    2006-216201    8/2006

* cited by examiner

*Primary Examiner*—Ali Neyzari
(74) *Attorney, Agent, or Firm*—Brinks Hofer Gilson & Lione

(57) ABSTRACT

An audio playback device is provided which can play back recorded audio data in an operational mode that is more convenient for the user. With a DVD-Audio disk 1 mounted, a navigation manager examines whether or not the DVD-Audio disk 1 includes an ASVSI file, that is, whether or not the DVD-Audio disk 1 includes a still picture to be displayed together with the audio data. Also, the navigation manager examines whether or not an AMGM_VOBS file exists in the DVD-Audio disk 1, that is, whether or not the DVD-Audio disk 1 includes a visual menu. When a still picture or visual menu is not included, a player mode is set to an AOP mode in which the still picture is not played back, while in other cases, the player mode is set to a VCAP mode in which the visual menu or visual contents can be played back and displayed.

18 Claims, 4 Drawing Sheets

AUDIO PLAYBACK DEVICE

BACKGROUND OF THE INVENTION

1. Field of the Invention

The present invention relates to a technology for playback control in an audio playback device, such as a DVD-Audio playback device for playing back a DVD-Audio disk.

2. Description of the Related Art

Providers of DVD-Audio disks to be played back by a DVD-Audio playback device can include in the DVD-Audio disk data on a still picture to be displayed together with playback of an audio track and data on visual menus for receiving various operations from a user regarding the playback of the audio track, as well as data recorded on the tracks.

On the other hand, the DVD-Audio specification allows the DVD-Audio playback device to serve as a video capable audio player (VCAP) for displaying still pictures and visual menus, or as an audio only player (AOP) or a simple audio player (SOP) for only playing back audio tracks without displaying the visual menus mentioned above and the like.

Generally, most of the DVD-Audio playback devices serving as the VCAP can also be configured to serve as the AOP in accordance with a selection by the user or the like. As one of the DVD-Audio playback devices capable of acting as both the VCAP and AOP, for example, Japanese Unexamined Patent Publication No. 2004-22023 discloses a DVD-Audio playback device which serves as the VCAP when a display device is usable, and as the AOP when the display device is not usable.

In order to play back the DVD-Audio disk in accordance with the provider's intent of the DVD-Audio disk, when acting as the VCAP, most of the DVD-Audio playback devices are likely to be configured not to perform the playback operation which may define a playback sequence autonomously, and which may lead to disregarding the visual menus or the like prepared by the provider of the DVD-Audio disk, for example, automatic sequential playback, automatic random playback, or repeated playback of data recorded on all tracks of the DVD-Audio disk.

In contrast, when the DVD-Audio playback device acts as the AOP, which assumes a playback operation disregarding the visual menus, the playback operation in the sequence that is autonomously defined by the DVD-Audio playback device is not against the provider's intent. More specifically, the playback operations include the automatic sequential playback, automatic random playback, and repeated playback of the data recorded on all the tracks of the DVD-Audio disk. Thus, most of the DVD audio playback devices serving as the AOP are also designed to perform such automatic sequential playback, automatic random playback, and/or repeated playback in accordance with the operation by the user or the like.

Even in the DVD-Audio playback device serving as the VCAP, when the DVD-Audio disk of interest for playback does not include data on still pictures and visual menus, a still picture or visual menu cannot be displayed. In addition, since the playback device acts as the VCAP, it does not perform the automatic sequential playback, the automatic random playback, or the repeated playback of the data on all tracks of the DVD-Audio disk. Therefore, when playing back a DVD-Audio disk not including data on still pictures and visual menus, the DVD-Audio playback device serving as the AOP would be more convenient for the user.

In the above-mentioned case, the user had to perform a complicated operation in the prior art involving switching settings so as to cause the DVD-Audio playback device to serve as the AOP.

SUMMARY OF THE INVENTION

Accordingly, it is an object of the invention to provide an audio playback device which can play back audio data recorded on a recording medium in one of plural operational modes, which is more convenient for the user, for controlling a playback sequence by using and without using a visual menu recorded on the medium, without needing any complicated operation by the user.

To this end, in one aspect of the invention, an audio playback device is adapted for playing back audio tracks recorded on a recording medium, which is capable of recording therein a visual menu for receiving an operation regarding a playback operation of the recording medium. The audio playback device includes a determination section for determining whether or not a visual menu is recorded on the recording medium. The audio playback device also includes a mode setting section for setting the audio playback device into a mode of displaying the visual menu and playing back the audio track recorded on the recording medium in a playback sequence defined in accordance with an operation received by the visual menu displayed when the determination section determines that the visual menu is recorded on the recording medium, and for setting the audio playback device into a mode of playing back the audio track recorded on the recording medium in a playback sequence autonomously defined without displaying the visual menu when the determination section determines that the visual menu is not recorded on the recording medium.

With this arrangement, when the visual menu is recorded on the recording medium, the visual menu is displayed, and the audio tracks are played back in the playback sequence defined based on the operation received by the visual menu displayed. In contrast, when the visual menu is not recorded on the recording medium, the audio tracks are played back in the playback sequence autonomously defined. Generally, if the visual menu is unusable, the limitation on the playback sequence is reduced, and thus various types of playback sequences may be used as the playback sequence autonomously defined. This provides the user with the convenience of the visual menu when the visual menu is recorded on the recording medium, and of playback functions by various types of playback sequences when the visual menu is not recorded on the recording medium. Accordingly, this allows the playback of the recording medium in the operational mode that is more convenient for the user without needing any complicated operation by the user.

In another aspect of the invention, an audio playback device is adapted for playing back audio tracks recorded on a recording medium, which is capable of recording therein visual contents to be displayed while playing back the audio track. The audio playback device includes a determination section for determining whether or not such visual contents are recorded on the recording medium. The audio playback device also includes a mode setting section for setting the audio playback device into a mode of displaying the visual contents while playing back the audio track when the determination section determines that the visual contents are recorded on the recording medium, and for setting the audio playback device into a mode of displaying an image previously recorded in the audio playback device while playing back the audio track when the determination section determines that the visual contents are not recorded on the recording medium.

With this arrangement, when the visual contents to be displayed while playing back the audio tracks are not recorded on the recording medium, the image previously recorded in the audio playback device is displayed while playing back the audio track. This can improve entertainment in playing back the audio tracks even on a recording medium without the visual contents.

In a further aspect of the invention, a DVD-Audio playback device is adapted for playing back a DVD-Audio disk while selectively serving as a video capable audio player (VCAP), an audio only player (AOP), or a simple audio player (SOP) in accordance with a mode set. The DVD-Audio playback device includes a visual menu determination section for determining whether or not a visual menu is recorded on the DVD-Audio disk. The DVD-Audio playback device also includes a mode setting section for setting the audio playback device into a mode of serving as the AOP or SOP when the visual menu determination section determines that the visual menu is not recorded on the DVD-Audio disk.

With this arrangement, when the visual menu is not recorded on the DVD-Audio disk, the DVD audio playback device acts as the AOP or SOP that can automatically select the playback sequence more freely than the VCAP. Accordingly, this allows the playback of the DVD-Audio disk in the operational mode that is more convenient for the user without needing any complicated operation by the user.

It should be noted that the DVD-Audio playback device may further be provided with an ASV determination section for determining whether or not audio still video (ASV) is recorded on the DVD-Audio disk, and when the ASV determination section determines that the ASV is recorded on the DVD-Audio disk, the mode setting section may prevent the audio playback device from being set into the mode of serving as the AOP or SOP even if the visual menu determination section determines that the visual menu is not recorded on the DVD-Audio disk.

Thus, in the DVD-Audio disk with the ASV recorded thereon, even when the visual menu is not recorded, the DVD-Audio playback device is not set into the mode of serving as the AOP or SOP, thereby preventing the ASV from not being displayed without conditions.

With this arrangement, the mode setting section sets the DVD-Audio playback device into the mode of serving as the VCAP when the visual menu determination section determines that the visual menu is recorded on the DVD-Audio disk. This provides the user with the convenience of the visual menu recorded on the DVD-Audio disk without needing any complicated operation by the user.

In this case, the ASV determination section disposed in the DVD-Audio playback device may determine whether or not audio still video (ASV) is recorded on the DVD-Audio disk. When the ASV determination section determines that the ASV is recorded on the DVD-Audio disk, the mode setting section may set the audio playback device into the mode of serving as the VCAP even if the visual menu determination section determines that the visual menu is not recorded on the DVD-Audio disk. This does not impair the entertainment in the ASV that is intended by the provider of the DVD-Audio disk including the ASV.

Preferably, provided with the ASV determination section, the DVD-Audio playback device may further include a recorded image displaying section for displaying an image previously recorded in the DVD-Audio playback device during the playback of the track recorded on the DVD-Audio disk when the ASV determination section determines that the ASV is not recorded on the DVD-Audio disk. Thus, for the DVD-Audio disk on which the ASV is not recorded, the image previously recorded in the DVD-Audio playback device may be displayed in place of the ASV, thereby improving the entertainment in playing back the audio tracks.

The visual menu determination section can determine whether or not the visual menu is recorded on the DVD-Audio disk, for example, in response to the presence or absence of any recorded AMGM_VOBS (audio manager menu video object set) on the DVD-Audio disk.

In a still further aspect of the invention, a DVD-Audio playback device is adapted for playing back a DVD-Audio disk, while selectively serving as a video capable audio player (VCAP), an audio only player (AOP), or a simple audio player (SOP) in accordance with a mode set. The DVD-Audio playback device includes an audio still video (ASV) determination section for determining whether or not an ASV is recorded on the DVD-Audio disk. The DVD-Audio playback device also includes a mode setting section for setting the audio playback device into a mode of serving as the AOP or SOP when the ASV determination section determines that the ASV is not recorded on the DVD-Audio disk.

With this arrangement, when an ASV is not recorded on the DVD-Audio disk, in other words, when there is little merit in serving as the VCAP because the disk does not store therein the contents that are to be played back and displayed together with data on the tracks, the DVD-Audio playback device acts as the AOP or SOP that can automatically select the playback sequence more freely than the VCAP. This enables playback of the DVD-Audio disk in the AOP or SOP operational mode that is more convenient for the user who places little importance on the convenience of the visual menu without needing any complicated operation by the user.

In order to enhance the entertainment of the DVD-Audio disk on which an ASV is not recorded, the above-mentioned DVD-Audio playback device preferably includes a recorded image displaying section for displaying an image previously recorded in the DVD-Audio playback device during the playback of the track recorded on the DVD-Audio disk when the ASV determination section determines that an ASV is not recorded on the DVD-Audio disk.

As can be seen from the above description, the invention provides an audio playback device which can play back audio data recorded on the recording medium in one of plural operational modes of controlling the playback sequence by using and without using the visual menu recorded on the recording medium, which mode is more convenient for the user, without needing any complicated operation by the user.

DESCRIPTION OF THE PREFERRED EMBODIMENTS

Preferred embodiments of the present invention will now be described with reference to the accompanying drawings by taking an application to a DVD-Audio playback device as an example.

Figure 1:
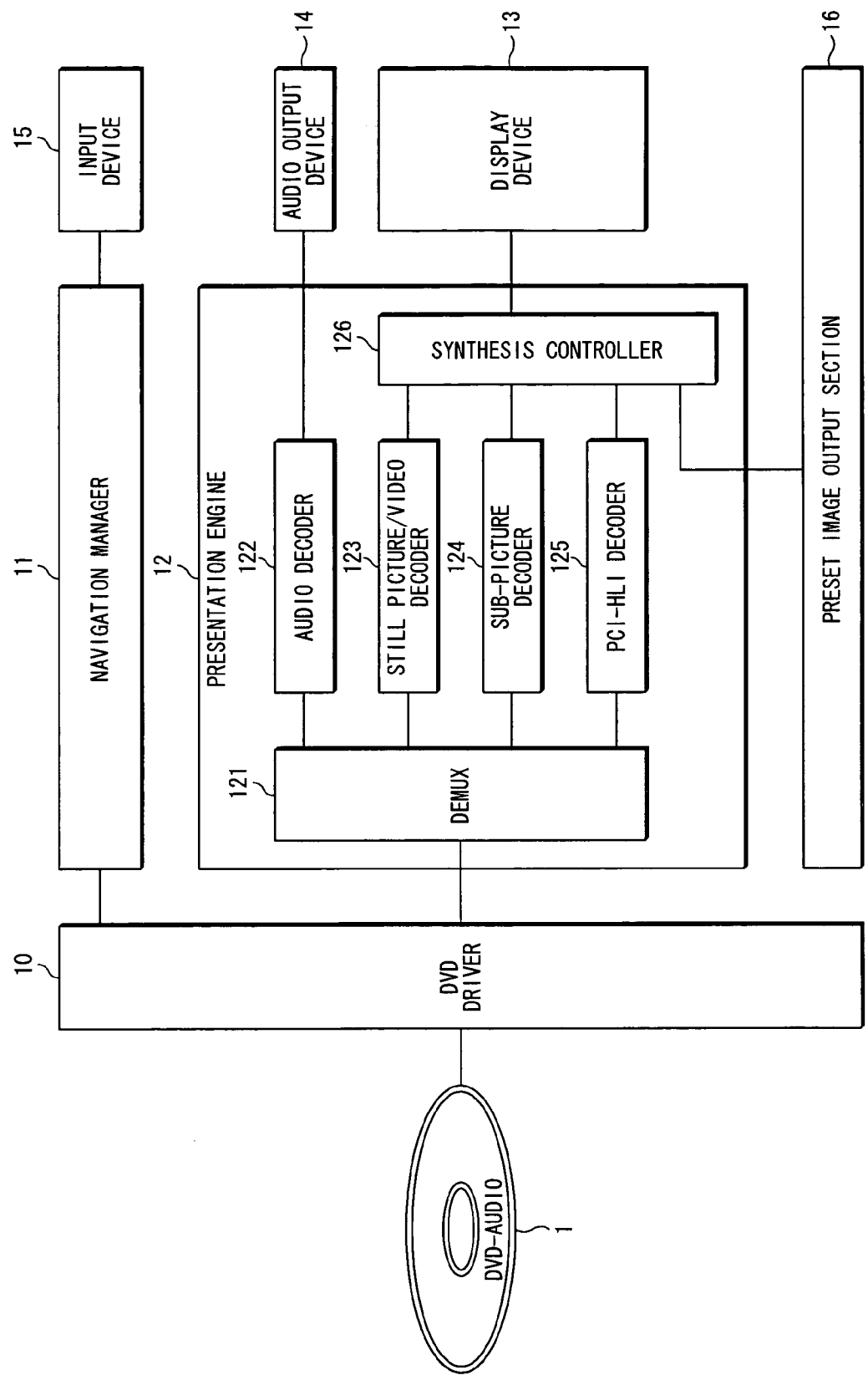
FIG. 1 is a block diagram of the configuration of a DVD-Audio device according to an embodiment of the present invention.

FIG. 1 illustrates the configuration of a DVD-Audio playback device according to an embodiment of the invention. As shown in FIG. 1, the DVD-Audio playback device includes a DVD driver 10 for reading and accessing a DVD-Audio disk 1, a navigation manager 11 for controlling a playback operation of the DVD-Audio disk 1, a presentation engine 12 for performing the playback operation of the DVD-Audio disk 1 under control of the navigation manager 11, a display device 13, an audio output device 14 for producing audio, such as a speaker, an input device 15, and a preset image output section 16.

The above-mentioned DVD-Audio playback device may be a general purpose computer which is provided with the DVD driver 10, the display device 13, the audio output device 14, and the input device 15 as peripheral equipment. In this case, the navigation manager 11, the presentation engine 12, and the preset image output section 16 as described above, or part of them, may be implemented as a process on the computer by executing a program with the computer.

Figure 2:
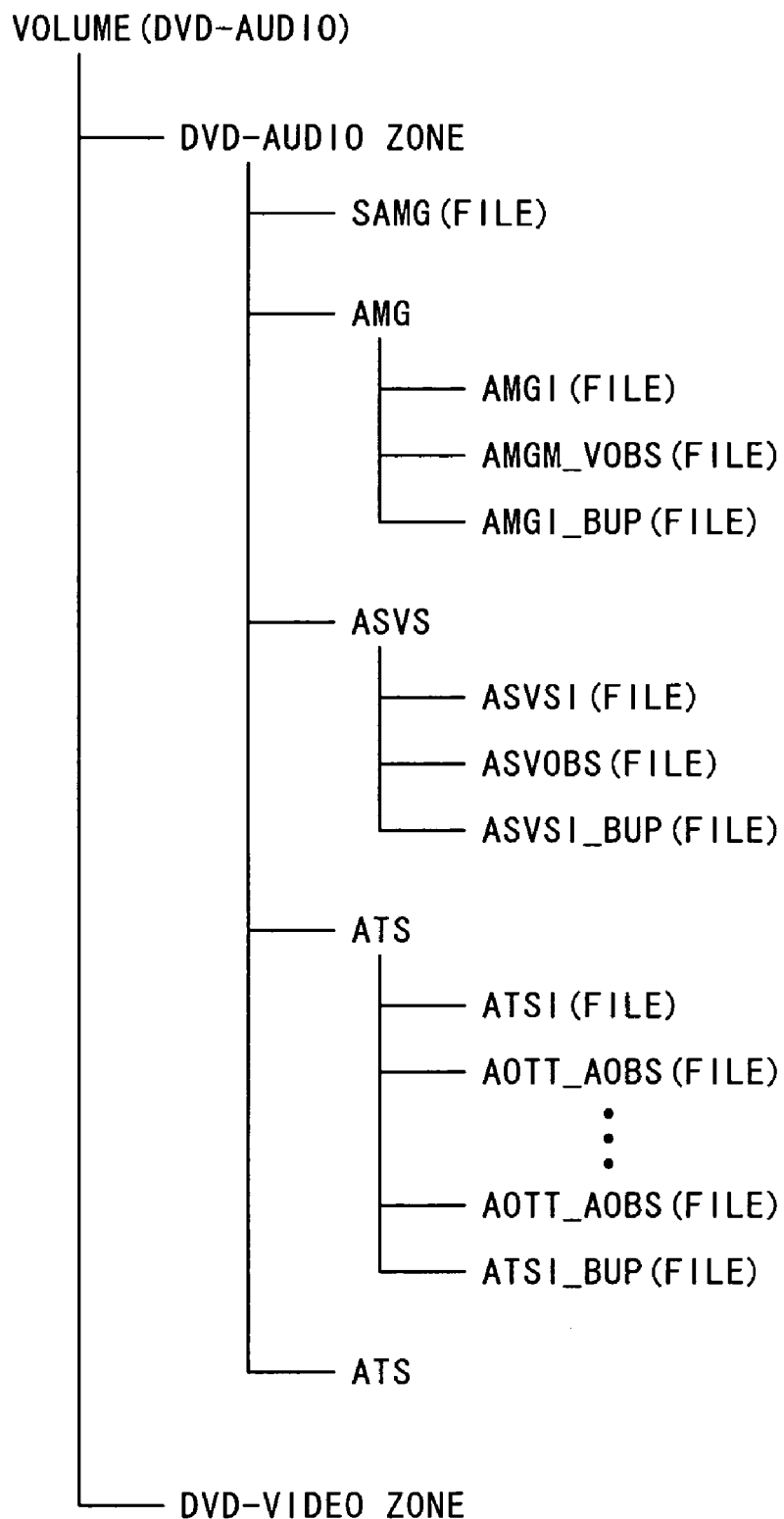
FIG. 2 is a diagram of a logical data structure of the DVD-Audio disk.

FIG. 2 illustrates a logical data structure recorded in the DVD-Audio disk 1. As shown in the figure, the DVD-Audio disk 1 includes a DVD-Audio zone and a DVD-Video zone. In the DVD-Audio zone, audio contents are stored according to the DVD-Audio specification, while, in the DVD-Video zone, video contents are stored according to a specification (a subset of the DVD-Video specification) with a partial limitation and adhering to the DVD-Video specification.

Data recorded in the DVD-Audio zone includes a Simple Audio Manager (SAMG), an Audio Manager (AMG), an Audio Still Video Set (ASVS), and one or more Audio Title Sets (ATS). The SAMG is recorded as a single file. The AMG includes an AMGI, an AMGM_VOBS, and an AMCI_BUP which serves as a backup of the AMGI, each of which is recorded as a single file. Data on a visual menu for receiving various operations regarding the playback of the audio tracks from the user may be included in the AMG.

The ASVS includes an ASVSI, an ASVOBS, and an ASVSI_BUP which serves as a backup of the ASVSI, each of which is recorded as a single file. Data on still pictures to be displayed with the playback of the audio tracks may be included in the ASVS.

The ATS includes an ATSI recorded as a single file, an AOTT_AOBS recorded as one or more files, and an ATSI_BUP which is a backup of the ATSI and recorded as a single file.

Note that the AMGM_VOBS and the ASVS may be recorded arbitrarily. A plurality of ATSs can be recorded.

Figure 3:
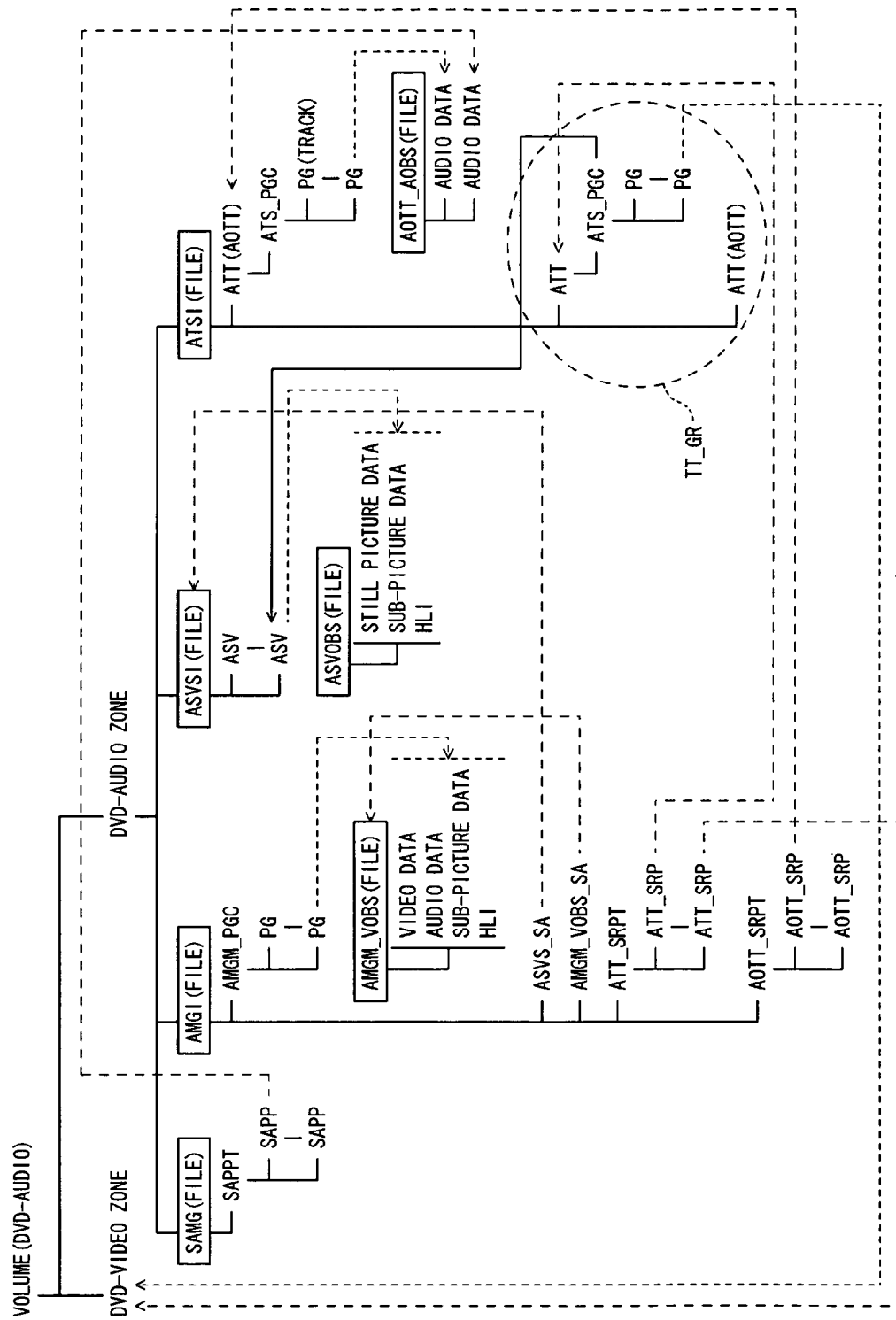
FIG. 3 is a diagram of a relationship between the logical data structure of the DVD-Audio disk and a playback structure thereof.

FIG. 3 illustrates a relationship between the logical data structure of the DVD-Audio disk 1 and a playback structure of the DVD-Audio disk 1. The playback sequence of presentation contents of the DVD-Audio disk 1 is controlled in units of tracks which are grouped, or of groups. As shown in the figure, the ATSI specifies the ATS including one or more Audio Titles (ATT) (Audio Only Title (AOTT)). Each ATT includes an ATS Program Chain (ATS_PGC), which specifies a playback order of one or more programs (PG). In the AOTT_AOBS, audio data or the like constituting each PG is recorded.

The ATS has two types. One of the types of the ATS is the ATS in which the PG of the ATS_PGC of the ATT uses the audio data stored in the AOTT_AOBS. In playing back the PG, the audio data in the AOTT_AOBS specified by the PG is played back. The other type is the ATS in which the PG of the ATS_PGC of the ATT uses the audio data in the DVD-Video zone, instead of the audio data in the AOTT_AOBS. In playing back the PG, the audio data in the DVD-Video zone specified by the PG is played back.

The ASVS specifies one or more audio still videos (ASVs). In the ASVOBS, still picture data, sub-picture data, and HLI, constituting each ASV, are stored. The ASV is played back based on the ATS_PGC when playing back the ATS_PGC.

The AMGI includes an Audio Manager Menu Program Chain (AMGM_PGC), an Audio Title Search Pointer Table (ATT_SRPT), an Audio Only Title Search Pointer Table (AOTT_SRPT), an ASVS_SA, and an AMGM_VOBS_SA, for displaying the visual menu. The AMGM_PGC specifies the playback order of one or more programs (PGs), and in the AMGM_VOBS, the video data, the audio data, the sub-picture data, and the HLI constituting each PG are stored. The ASVS_SA is a pointer indicative of a top address of the ASVSI. When the ASV does not exist, a value of 00000000h is stored in the ASVS_SA. The AMGM_VOBS_SA is a pointer indicative of a top address of the AMGM_VOBS. When the AMGM_VOBS does not exist, 00000000h is stored in the AMGM_VOBS_SA.

The Audio Title Search Pointer Table (ATT_SRPT) specifies the group of the track or the ATT storing therein the data on the track of each group in the DVD-Audio playback device serving as the VCAP, and includes an audio title search pointer (ATT_SRP) for indicating the ATT belonging to the corresponding group. In the ATT_SRPT, the VTT can also serve as the ATT by designating the VTT of the VTS by the ATT_SRP. In this case, the designated VTT is played back as the ATT (Audio with Video Title AVTT) in the DVD-Audio playback device. In each ATT, one PG corresponds to one track.

The Audio Only Title Search Pointer Table (AOTT_SRPT) specifies the group of the track, and the ATT for storing therein the data on the track of each group in the DVD-Audio playback device serving as the AOP. The AOTT_SRPT includes an audio title search pointer (AOTT_SRP) indicative of the ATT (AOTT) belonging to the corresponding group.

The SAMG specifies the group of the track, and the track of the corresponding group in the DVD-Audio playback device serving as a Simple Audio Player (SOP), which is a DVD-Audio player without having a PGC playback function, and includes a Simple Audio Play Pointer Table (SAPPT). The SAPPT includes a Simple Audio Play Pointer (SAPP) constituting each track of the corresponding group and directly indicating the audio data of the AOTT_AOBS.

Returning now to FIG. 1, in the presentation engine 12, a demultiplexer 121 extracts the AMGM_PGC and the ATS_PGC to be played back by the navigation manager 11, the audio data, such as the AMGM_VOBS, ASVOBS, or AOTT_AOBS, designated by the PG included in the above PGC, the video data, the still picture data, the sub-picture data, the highlight information, and the like. An audio decoder 122 decodes the extracted audio data, and provides it to the audio output device 14. A video/still picture decoder 123 decodes the video data and/or still picture data. A sub-picture decoder 124 decodes the sub-picture, while a PCI-HLI decoder 125 decodes the highlight information HLI or the like. A synthesis controller 126 generates an image including a button defined by the sub-picture, the highlight information HLI, or the like, and combines the generated image and another image decoded by a video/still picture decoder 123 and supplies the combined image to the display device 13 as a playback image.

The preset image output section 16 stores therein a plurality of pieces of image data, and decodes and supplies the image data stored therein to the synthesis controller 126 of the presentation engine 12 in accordance with an instruction from the navigation manager 11. The synthesis controller 126 supplies the image from the preset image output section 16 to the display device 13, instead of the playback image, in accordance with an instruction from the navigation manager 11.

Now, a playback control operation of the navigation manager in the above-mentioned DVD-Audio playback device will be described in detail.

Figure 4:
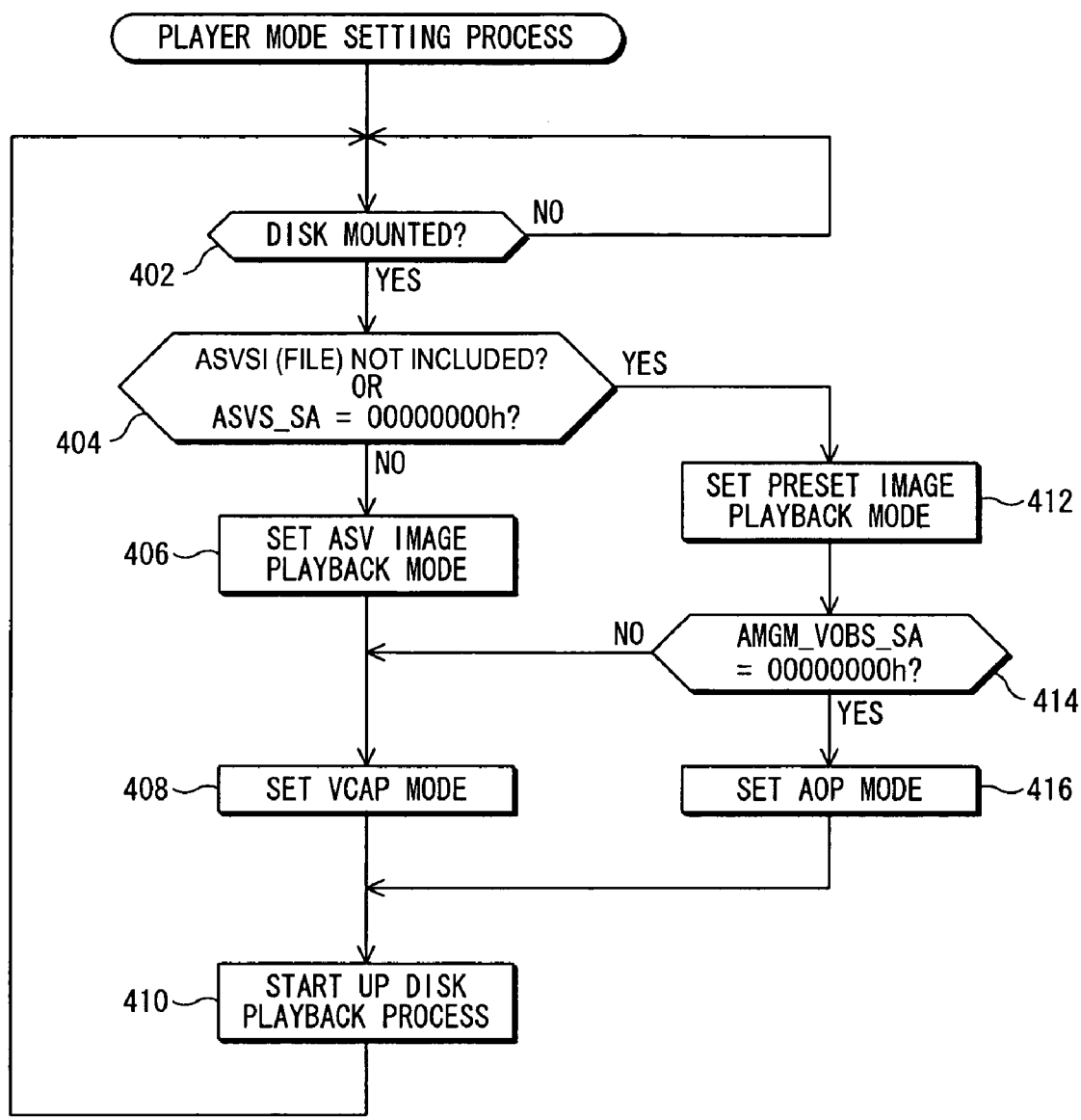
FIG. 4 is a flowchart showing a player mode setting process according to the embodiment of the invention.

FIG. 4 shows a player mode setting process performed by the navigation manager 11. As shown in the flowchart, this process first monitors whether or not a DVD-Audio disk 1 is mounted on the DVD-Audio playback device (step 402). If a DVD-Audio disk 1 is mounted on the playback device, it is determined by the DVD driver 10 whether or not an ASVSI file exists in the DVD-Audio disk 1 (step 404). This examines whether or not the DVD-Audio disk 1 includes an ASVS defining a still picture to be displayed together with the audio data. Note that at this time, the ASVS_SA of the AMGI file is examined, and when the value thereof is 00000000h, it may be determined that an ASVSI file does not exist, and that the DVD-Audio disk 1 does not include an ASVS defining the still picture to be displayed together with the audio data.

When the DVD-Audio disk 1 is determined to include an ASVS defining the still picture to be displayed together with the audio data, the DVD-Audio playback device is set to an ASV image playback mode as a picture output mode (step 406).

The DVD-Audio playback device is set to a VCAP mode as a player mode (step 408), and then a disk playback process is started (step 410), whereby the operation returns to the monitoring step 402. It should be noted that when the DVD-Audio disk 1 includes the ASVS, without performing the step 408, the disk playback process may be started with the current player mode being maintained (step 410), and then the operation may return to the monitoring step 402.

In step 404, if the DVD-Audio disk 1 does not include an ASVS defining the still picture to be displayed together with the audio data, then the DVD-Audio playback device is set into a preset image playback mode as the picture output mode (step 412).

The AMGM_VOBS_SA of the AMGI file in the DVD-Audio disk 1 is examined by the DVD driver 10. Depending on whether the value of the AMGM_VOBS_SA is 00000000h or not, it is determined whether or not an AMGM_VOBS file exists in the DVD-Audio disk 1, that is, whether the DVD-Audio disk 1 includes a visual menu or not (step 414).

When the DVD-Audio disk 1 includes a visual menu, the operation proceeds to step 408, where the DVD-Audio playback device is set to the VCAP mode as the player mode, and then the disk playback process is started (step 410), whereby the operation returns to the monitoring step 402. It should be noted that when the DVD-Audio disk 1 includes a visual menu, without performing the step 408, the disk playback process may be started with the current player mode being maintained (step 410), and then the operation may return to the monitoring step 402.

In contrast, when the DVD-Audio disk 1 does not include a visual menu, the DVD-Audio playback device is set to the AOP mode as the player mode (step 416), and the disk playback process is started (step 410), whereby the operation returns to the monitoring step 402.

As a result of the player mode setting process described above, when the DVD-Audio disk 1 does not include both data on the still picture and data on the visual menu which are to be played back and displayed together with the audio data at the same time, the DVD-Audio playback device is set to the AOP mode as the player mode. In contrast, when the disk includes one or both of data on the still picture and data on the visual menu, the DVD-Audio playback device is set to the VCAP mode as the player mode, or remains in the player mode taken at the last playback time of the DVD-Audio disk 1.

When the DVD-Audio disk 1 does not include data on the still picture to be displayed together with the audio data, the DVD-Audio playback device is set to the preset image playback mode as the picture output mode. In contrast, when the disk includes data on the still picture to be displayed together with the audio data, the DVD-Audio playback device is set to an ASV image playback mode as the picture output mode.

Note that in the player mode setting process described above, when the AMGM_VOBS file does not exist in the DVD-Audio disk 1, or when the DVD-Audio disk 1 does not include a visual menu, the DVD-Audio playback device may be set to the AOP mode as the player mode regardless of the presence or absence of the ASVSI file, that is, regardless of whether or not the DVD-Audio disk 1 includes the ASVS for defining the still picture to be displayed together with the audio data. Also, in this case, in the player mode setting process described above, when the AMGM_VOBS file exists in the DVD-Audio disk 1, that is, when the DVD-Audio disk 1 includes a visual menu, the DVD-Audio playback device may be set to the VCAP mode as the player mode without conditions.

Alternatively, in the player mode setting process described above, when the ASVSI file does not exist in the DVD-Audio disk 1, that is, when the DVD-Audio disk 1 does not include the ASVS for defining the still picture to be displayed together with the audio data, the DVD-Audio playback device may be set to the AOP mode as the player mode regardless of whether or not the DVD-Audio disk 1 includes a visual menu.

Now, an example of the operation of the disk playback process started at step 410 will be described in detail.

First, when the VCAP mode is set as the player mode, the navigation manager 11 refers to auto play information (AP_INF) included in the AMGI of the AMG in the DVD-Audio disk 1, and examines whether or not starting of playback from the first track of the first group is instructed in the AP_INF. If starting of playback from the first track of the first group is described in the AP_INF, the first group defined by the ATT_SRPT is set as a group of interest for playback. Then, the tracks within the group of interest are played back from the first track in sequence. After playing back all the tracks within the group of interest, the playback is terminated, and the DVD-Audio playback device stands by for the occurrence of a user's operation or manipulation. The occurrence of the user's operation causes the playback device to perform the playback operation according to the user's manipulation. It should be noted that after the playback of all the tracks of the group of interest for the playback is finished, the next group may be set as a next group of interest for playback next, and the tracks of this next group may be played back from the first track thereof in sequence. The playback of the group is carried out by the ATS_PGCs of the respective ATTs belonging to the group in sequence.

In contrast, when the AP_INF referred to after starting the playback of the DVD-Audio disk 1 as mentioned above does not describe the playback from the first track of the first group, the AMGM_PGC of the AMG is played back to reproduce the visual menu, so that the playback operation is carried out according to the description of the visual menu and the user's operation. If the AMGM_PGC does not exist, the first group defined by the ATT_SRPT is set as the group of interest for playback. After all the tracks of the group of interest for the playback are played back, the playback operation is stopped as described above. It should be noted that after the playback of all the tracks of the group of interest is finished, the next group may be set as a next group of interest for playback next, and the tracks of this next group may be played back from the first track thereof in sequence.

In the above-mentioned operation, in a case where the ATT_SRP of the ATT_SRPT describes that the visual menu should be played back after the playback of the ATT is finished, if the playback of the ATS_PGC of the ATT is finished, then the AMGM_PGC of the AMG is played back without conditions, so that the visual menu is played back.

Furthermore, in the above-mentioned operation, when the ASV image playback mode is set as the picture output mode, the navigation manager causes the synthesis controller 126 to combine the image including the button defined by the sub-picture and the highlight information HLI or the like with the image decoded by the video/still picture decoder 123, and to send the combined image to the display device 13.

In contrast, when the preset image playback mode is set as the picture output mode, during the playback time of the ATS_PGC, or during the time other than the playback time of the AMGM_PGC, the navigation manager causes the preset image output section 16 to sequentially decode the image data stored in the preset image output section 16, and causes the synthesis controller 126 to send the image supplied from the preset image output section 16 to the display device 13 instead of the playback image. Note that during other time periods, the above-mentioned playback image is supplied to the display device 13 by the synthesis controller 126.

When the AOP mode is set as the player mode, the navigation manager 11 performs the playback operation in accordance with the playback mode to which the DVD-Audio playback device has been set at the time, or the playback mode defined by the user's operation, after examining the structure of the groups or tracks recorded in the DVD-Audio disk 1 based on the AOTT_SRP of the AOTT_SRPT, or the ATS_PGC of the AOTT. The playback modes include a sequential playback mode in which data recorded on all tracks of the DVD-Audio disk 1 is automatically played back in sequence, a random playback mode in which data recorded on all tracks of the DVD-Audio disk 1 or all tracks of a group thereof is played back in a random manner, and a repeated playback mode in which data recorded on all tracks of the DVD-Audio disk 1 or all tracks of a group thereof or a specific track thereof is repeatedly played back.

When the AOP mode is set as the player mode, the preset image playback mode is set as the picture output mode. In the AOP mode set as the player mode, regardless of the picture output mode, during the entire time of playback of the DVD-Audio disk 1, the navigation manager causes the preset image output section 16 to decode in sequence image data stored in the preset image output section 16, while causing the synthesis controller 126 to feed the image supplied from the preset image output section 16 to the display section 13, instead of the playback image.

In the above description, various embodiments of the invention have been described.

It should be noted that at step 416 of the player mode setting process, a Simple Audio Player (SOP) mode may be set instead of the AOP mode.

When the SOP mode is set as the player mode, the navigation manager 11 may perform the playback operation in accordance with the playback mode to which the DVD-Audio playback device has been set at the time, or the playback mode defined by the user's operation, such as the sequential playback mode, the random playback mode, or the repeated playback mode as mentioned above, after examining the structure of the groups or tracks recorded in the DVD-Audio disk 1 based on the SAPP of the SAPPT. In the SOP mode set as the player mode, regardless of the picture output mode, during the entire time of playback of the DVD-Audio disk 1, the navigation manager causes the preset image output section 16 to decode in sequence image data stored in the preset image output section 16, while causing the synthesis controller 126 to feed the image supplied from the preset image output section 16 to the display section 13, instead of the playback image.

As can be seen from the above description, the DVD-Audio playback device of the embodiments serves as the VCAP when a visual menu is recorded on the DVD-Audio disk 1, thereby providing the user with the convenience of the visual menu, while serving as the AOP or SOP that can automatically select the playback sequence more freely than the VCAP when a visual menu (or a still picture to be played back at the same time as the playback of the visual menu and the tracks) is not recorded in the DVD-Audio disk 1. Thus, the DVD-Audio disk 1 can be played back in the operational mode that is more convenient for the user without needing any complicated operation by the user.

Thus, for the DVD-Audio disk 1 on which an ASV is not recorded, the image previously recorded in the preset image output section 16 may be displayed in place of the ASV, thereby improving the entertainment in playing back the audio tracks of the DVD-Audio disk 1, on which an ASV is not recorded.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An audio playback device for playing back audio tracks recorded on a recording medium, which is capable of recording therein a visual menu for receiving an operation from a user regarding a playback operation of the recording medium, the audio playback device comprising:

a determination section for determining whether or not said visual menu is recorded on the recording medium; and a mode setting section for setting said audio playback device into a mode of displaying the visual menu and playing back the audio tracks recorded on the recording medium in a playback sequence defined in accordance with the operation received by the visual menu displayed when the determination section determines that the visual menu is recorded on the recording medium, and for setting said audio playback device into a mode of playing back the audio tracks recorded on the recording medium in a playback sequence autonomously defined without displaying a visual menu when the determination section determines that a visual menu is not recorded on the recording medium.

2. A DVD-Audio playback device for playing back a DVD-Audio disk, while selectively serving as a video capable audio player (VCAP), an audio only player (AOP), or a simple audio player (SOP) in accordance with a set mode, the DVD-Audio playback device comprising:

a visual menu determination section for determining whether or not a visual menu is recorded on the DVD-Audio disk; and a mode setting section for setting the audio playback device into a mode of serving as the AOP or SOP when the visual menu determination section determines that a visual menu is not recorded on the DVD-Audio disk.

3. The DVD-Audio playback device according to claim 2, wherein said mode setting section sets said audio playback device into the mode of serving as the VCAP when the visual menu determination section determines that a visual menu is recorded on the DVD-Audio disk.

4. The DVD-Audio playback device according to claim 3, further comprising an ASV determination section for determining whether or not audio still video (ASV) is recorded on the DVD-Audio disk, wherein, when said ASV determination section determines that an ASV is recorded on the DVD-Audio disk, said mode setting section sets the audio playback device into the mode of serving as the VCAP even if said visual menu determination section determines that a visual menu is not recorded on the DVD-Audio disk.

5. The DVD-Audio playback device according to claim 4, further comprising a recorded image displaying section for displaying an image previously recorded in the DVD-Audio playback device during the playback of a track recorded on the DVD-Audio disk when said ASV determination section determines that an ASV is not recorded on the DVD-Audio disk.

6. The DVD-Audio playback device according to claim 2, further comprising an ASV determination section for determining whether or not audio still video (ASV) is recorded on the DVD-Audio disk, wherein, when said ASV determination section determines that an ASV is recorded on the DVD-Audio disk, said mode setting section prevents the audio playback device from being set into the mode of serving as the AOP or SOP even if said visual menu determination section determines that a visual menu is not recorded on the DVD-Audio disk.

7. The DVD-Audio playback device according to claim 2, wherein said visual menu determination section determines whether or not a visual menu is recorded on the DVD-Audio disk, in response to the presence or absence of any recorded AMGM_VOBS (audio manager menu video object set) on the DVD-Audio disk.

8. A DVD-Audio playback device for playing back a DVD-Audio disk, while selectively serving as a video capable audio player (VCAP), an audio only player (AOP), or a simple audio player (SOP) in accordance with a set mode, the DVD-Audio playback device comprising:

an audio still video (ASV) determination section for determining whether or not an ASV is recorded on the DVD-Audio disk; and a mode setting section for setting the audio playback device into a mode of serving as the AOP or SOP when the ASV determination section determines that an ASV is not recorded on the DVD-Audio disk.

9. The DVD-Audio playback device according to claim 8, further comprising a recorded image displaying section for displaying an image previously recorded in the DVD-Audio playback device during the playback of a track recorded on the DVD-Audio disk when said ASV determination section determines that an ASV is not recorded on the DVD-Audio disk.

10. A method of playing back a recording medium in an audio playback device adapted for playing back audio tracks recorded on the recording medium, which is capable of recording therein a visual menu for receiving an operation from a user regarding a playback operation of the recording medium, the playback method comprising the steps of:

determining whether or not said visual menu is recorded on the recording medium;

setting said audio playback device into a mode of displaying the visual menu and playing back the audio tracks recorded on the recording medium in a playback sequence defined in accordance with the operation received by the visual menu displayed when the visual menu is determined to be recorded on the recording medium; and setting said audio playback device into a mode of playing back the audio tracks recorded on the recording medium in a playback sequence autonomously defined without displaying a visual menu when a visual menu is determined not to be recorded on the recording medium.

11. A disk playback method in a DVD-Audio playback device for playing back a DVD-Audio disk, while selectively serving as a video capable audio player (VCAP), an audio only player (AOP), or a simple audio player (SOP) in accordance with a set mode, the playback method comprising the steps of:

determining whether or not a visual menu is recorded on the DVD-Audio disk; and setting the audio playback device into a mode of serving as the AOP or SOP when a visual menu is determined not to be recorded on the DVD-Audio disk.

12. The disk playback method according to claim 11, further comprising the step of setting said audio playback device into the mode of serving as the VCAP when a visual menu is determined to be recorded on the DVD-Audio disk.

13. The disk playback method according to claim 12, further comprising the steps of:

determining whether or not audio still video (ASV) is recorded on the DVD-Audio disk; and when an ASV is determined to be recorded on the DVD-Audio disk, setting the audio playback device into the mode of serving as the VCAP even if a visual menu is determined not to be recorded on the DVD-Audio disk.

14. The disk playback method according to claim 13, further comprising the step of displaying an image previously recorded in the DVD-Audio playback device during the playback of a track recorded on the DVD-Audio disk when an ASV is determined not to be recorded on the DVD-Audio disk.

15. The disk playback method according to claim 11, further comprising the step of determining whether or not audio still video (ASV) is recorded on the DVD-Audio disk, and wherein, when an ASV is determined to be recorded on the DVD-Audio disk, the audio playback device is prevented from being set into the mode of serving as the AOP or SOP even if a visual menu is determined not to be recorded on the DVD-Audio disk.

16. The disk playback method according to claim 11, wherein the determination of whether or not a visual menu is recorded on the DVD-Audio disk is performed in response to the presence or absence of a recorded AMGM VOBS on the DVD-Audio disk.

17. A disk playback method in a DVD-Audio playback device for playing back a DVD-Audio disk, while selectively serving as a video capable audio player (VCAP), an audio only player (AOP), or a simple audio player (SOP) in accordance with a set mode, the disk playback method comprising the steps of:

determining whether or not audio still video (ASV) is recorded on the DVD-Audio disk; and setting the audio playback device into a mode of serving as the AOP or SOP when an ASV is determined not to be recorded on the DVD-Audio disk.

18. The disk playback method according to claim 17, further comprising the step of displaying an image previously recorded in the DVD-Audio playback device during the playback of a track recorded on the DVD-Audio disk when an ASV is determined not to be recorded on the DVD-Audio disk.

* * * * *